(12) United States Patent
O'Neil

(10) Patent No.: US 10,282,791 B2
(45) Date of Patent: May 7, 2019

(54) COMMUNICATION AGGREGATOR

(71) Applicant: LOGOS Identity, LLC, St. Louis, MO (US)

(72) Inventor: Ryan O'Neil, St. Louis, MO (US)

(73) Assignee: CURATE, INC., St. Louis, MO (US)

( * ) Notice: Subject to any disclaimer, the term of this patent is extended or adjusted under 35 U.S.C. 154(b) by 384 days.

(21) Appl. No.: 14/186,961

(22) Filed: Feb. 21, 2014

(65) Prior Publication Data

US 2014/0244652 A1 Aug. 28, 2014

Related U.S. Application Data

(60) Provisional application No. 61/768,167, filed on Feb. 22, 2013.

(51) Int. Cl.
*G06Q 50/00* (2012.01)
*G06F 16/2455* (2019.01)

(52) U.S. Cl.
CPC ....... *G06Q 50/01* (2013.01); *G06F 16/24568* (2019.01)

(58) Field of Classification Search
CPC ........ G06F 17/30516; G06F 16/24568; G06Q 50/01
See application file for complete search history.

(56) References Cited

U.S. PATENT DOCUMENTS

| | | | | |
|---|---|---|---|---|
| 7,886,000 B1* | 2/2011 | Polis | ............ | H04L 67/2833 455/466 |
| 2009/0058611 A1* | 3/2009 | Kawamura | ............ | H04N 7/185 340/10.1 |
| 2012/0260189 A1* | 10/2012 | Howard | ............ | H04M 1/72552 715/739 |
| 2013/0024277 A1* | 1/2013 | Tuchman | ............ | G06Q 30/0241 705/14.49 |
| 2013/0086105 A1* | 4/2013 | Hammontree | .... | G06F 17/30864 707/769 |
| 2013/0298000 A1* | 11/2013 | Zuccarino | ............ | G06F 17/2235 715/205 |
| 2014/0343994 A1* | 11/2014 | Graff | ................ | G06Q 10/1095 705/7.19 |

OTHER PUBLICATIONS

U.S. Appl. No. 61/641,845, filed May 2, 2012.*

* cited by examiner

*Primary Examiner* — Jay A Morrison
(74) *Attorney, Agent, or Firm* — Thompson Coburn LLP

(57) ABSTRACT

A communication aggregator capable of obtaining and displaying a record of party-to-party communication records across one or more communication mediums. This aggregation application serves to provide a user with simplified communication records between one or more parties.

18 Claims, 9 Drawing Sheets

COMMUNICATION AGGREGATOR

CROSS REFERENCE TO RELATED APPLICATION(S)

This application claims the benefit of U.S. Provisional Patent application Ser. No. 61/768,167 filed Feb. 22, 2013, the entire disclosure is herein incorporated by reference.

BACKGROUND

1. Field of the Invention

This invention is related to the field of devices, systems and methods of party-to-party cross-medium interaction aggregation via an aggregation application.

2. Description of Related Art

Years ago, there were very few options on how to interact with others. Some of the major options of communication were: physically communicating while in the presence of another, writing a letter, and sending a verbal message via a messenger. As technology moves forward, the ways in which parties can interact are multiplying. Even within an individual communication medium, there are multiplied formats for interacting with another party. People have begun to communicate across many technological platforms using computing devices including but not limited to: a mobile phone, a desktop computer, computer-enhanced eyewear, and computerized tablets. These devices are utilized for many reasons (including calling for data, receiving communication, displaying multimedia, composing messages, sending interactions, etc.) using numerous different communication applications present on the device.

Because of the multiplicity of communication mediums and applications, two or more parties may not limit a conversation to a single medium or application but may span their conversation across several platforms. As an example, a user may send a public social media message to a friend asking about an event that happened. Due to privacy or a myriad of other factors, the friend may choose to respond back using an SMS text message, an e-mail, a private social media message or another medium or application. While the conversation may happen in sequential order and between the two parties, their conversation is fragmented and broken-up between two or more different mediums of communication. Some examples of problems caused by this fragmented communication broken-up by different communication applications includes, but is not limited to: misplaced communication, broken conversations, a loss of time and the frustration associated with interacting with multiple applications and inefficient records of messages.

Some virtual networks or other types of communication mediums may have systems where private, intra-medium communication may be organized according to party. This allows a user to see the private interactions between the user and another party; however, the public communication between the two parties may not be reflected in the listing nor is the private communication from other mediums included. Communication mediums may allow cross-platform public communication to be combined into a public listing of updates. While this allows the user to stay current with updates of other parties, these mediums do not allow party-to-party interactions to be aggregated based on the two parties' relationships from communications to each other across multiple different communication applications or mediums.

SUMMARY

Because of these and other problems in the art, described herein, among other things, are systems and methods for aggregating party-to-party communications and interactions across different applications and mediums into a single aggregator application.

As a preliminary matter, it is contemplated that the aggregator application described can handle two or more party-to-party communications across one or more applications or mediums. However, for the sake of simplicity in the explanation of certain embodiments of the aggregator application disclosed herein, various embodiments of the aggregator application will be described in accordance with communications between "Party A" and "Party B." This description is purely exemplary and in no manner should be viewed as limiting. Further, it should be understood that the terms "medium(s)" and "application(s)" as used herein should be read broadly to encompass any medium or application known to those of ordinary skill in the art through which one or more parties could exchange interactions such as, but not limited to, e-mail, telephone, text, video or pictorial communications.

There is described herein, among other things, a method of aggregating electronic communications in a communication application aggregator system, the method comprising: providing a communication application aggregator system including: a computing device capable of receiving inputs from a plurality of communication mediums; and a database including a plurality of parties; the computing device searching the inputs from the plurality of communication mediums for records of communications from a first of the parties; and the computing device indexing the communications from the first of the parties into a first communication stream.

In an embodiment, the method further comprises the computing device searching the inputs from the plurality of communication mediums for records of communications from a second of the parties; the computing device indexing the communications from the second of the parties into a second communication stream; and the computing device aggregating the first communication stream and the second communication stream into a single new communication stream.

In an embodiment of the method, the computing device further includes a display and the new communication stream is displayed on the display.

In an embodiment of the method, the display is a component of a user wearable device.

In an embodiment of the method, at least one of the parties comprises a human user of at least one of the communication mediums.

In an embodiment of the method, at least one of the parties comprises a group of human users of at least one of the communication mediums.

In an embodiment of the method, the plurality of the communication mediums includes at least one of: a social media platform, an short message system (SMS) based communication system, an electronic mail system, a telephone based communication system, a mobile device based interaction, or an internet based message.

In an embodiment of the method, the first and the second of the parties are selected by a human user.

In an embodiment of the method, the first and the second parties are selected by the computing device performing an automated recognition function.

In an embodiment of the method, the automated recognition function utilizes at least one of: facial identification, geographic location, or vocal identification.

In an embodiment of the method, the database is physically remote from the computing device.

There is also described herein, in an embodiment, a communication aggregator system comprising: a computing device capable of receiving inputs from a plurality of communication mediums; and a database including a plurality of parties; wherein, the computing device is configured to search the inputs from the plurality of communication mediums for records of communications from a first of the parties; and wherein, the computing device is configured to index the communications from the first of the parties into a first communication stream.

In an embodiment of the system, the computing device is configured to search the inputs from the plurality of communication mediums for records of communications from a second of the parties; the computing device is configured to index the communications from the second of the parties into a second communication stream; and the computing device is configured to aggregate the first communication stream and the second communication stream into a single new communication stream.

In an embodiment of the system, the computing device further includes a display and the new communication stream is displayed on the display.

In an embodiment of the system, the display is a component of a user wearable device.

In an embodiment of the system, at least one of the parties comprises a human user of at least one of the communication mediums.

In an embodiment of the system, at least one of the parties comprises a group of human users of at least one of the communication mediums.

In an embodiment of the system, the plurality of the communication mediums includes at least one of: a social media platform, an short message system (SMS) based communication system, an electronic mail system, a telephone based communication system, a mobile device based interaction, or an internet based message.

There is also described herein, in an embodiment, a non-transitory computer readable medium for aggregating electronic communications, the medium comprising: computer readable instructions for searching the inputs from the plurality of communication mediums for records of communications from a first of the parties; and computer readable instructions for indexing the communications from the first of the parties into a first communication stream.

In an embodiment, the medium further comprises: computer readable instructions for searching the inputs from the plurality of communication mediums for records of communications from a second of the parties; computer readable instructions for indexing the communications from the second of the parties into a second communication stream; and computer readable instructions for aggregating the first communication stream and the second communication stream into a single new communication stream.

BRIEF DESCRIPTION OF THE DRAWINGS

In the following description of various illustrative embodiments, reference is made to the accompanying figures, which form a part hereof, and in which is shown, by way of illustration, various embodiments in which aspects of the disclosure may be practiced. It is to be understood there may be other embodiments that can be utilized, as well as various modifications to the structure and function that can be made without departing from the scope of the present disclosure.

FIG. 4 depicts an embodiment of a user interface of an embodiment of the aggregation application disclosed herein, the aggregation application including a listing of one or more parties that the user has had interaction with.

DETAILED DESCRIPTION OF PREFERRED EMBODIMENTS

Figure 1A:
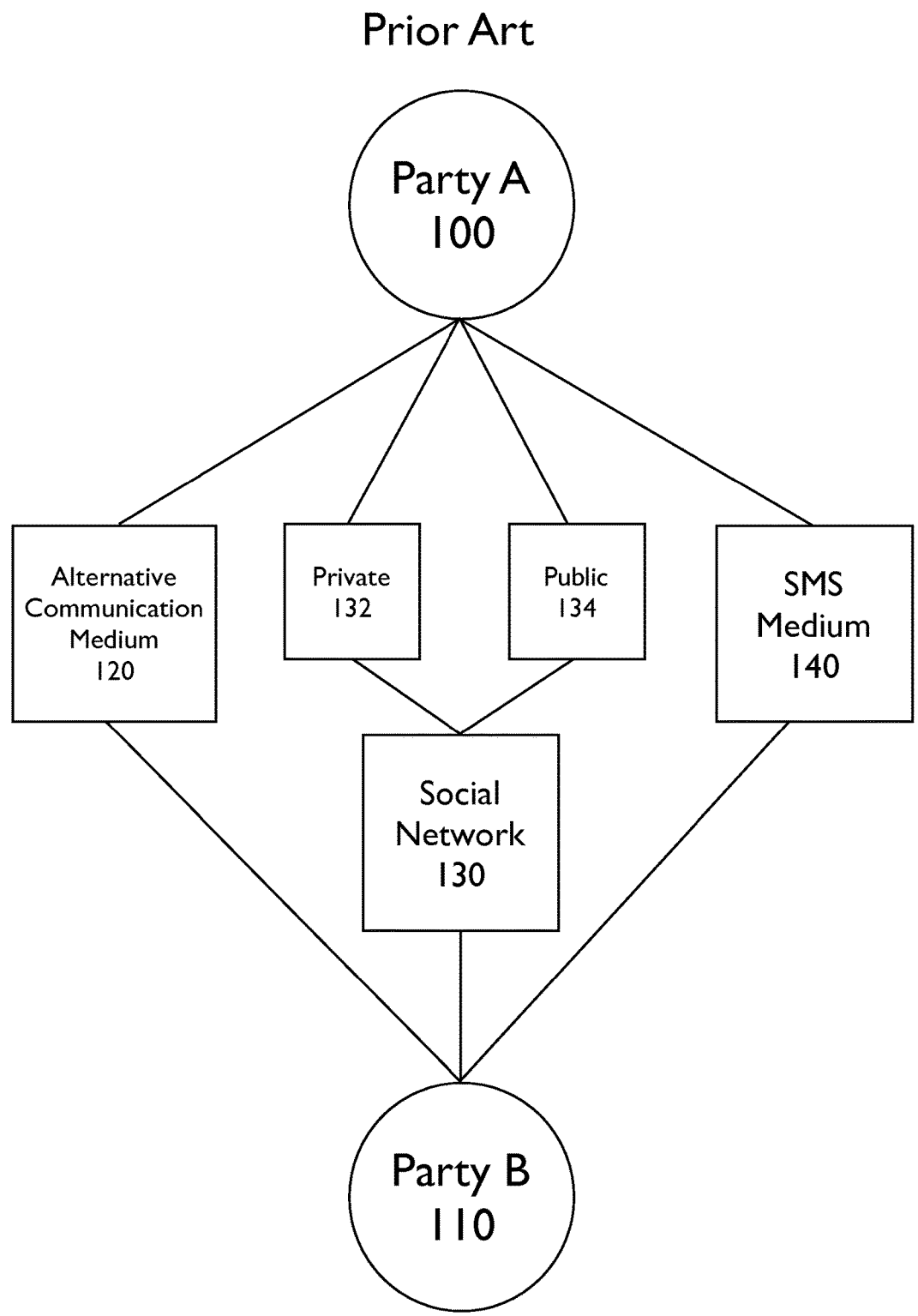
FIG. 1a depicts a flowchart of a method for how interactions between two parties across multiple communication applications occurs in the systems of the prior art.

FIG. 1a describes the current state of the art in relation to interactions that a party A (100) has with a party B (110) across multiple communication applications and mediums. In the methods and systems of the prior art, when party A (100) seeks a synopsis of his or her cross-medium and/or cross-application interactions with party B (110), party A (100) would have to open and activate several separate applications to view content involved with the conversation. Stated differently, if party B (110) wanted to access all of the communications party A (100) had sent to party B (110) within a relevant time period over multiple mediums and/or communication applications, party B (110) would have to individually open and check each medium through which the parties communicated. For example, as depicted in FIG. 1a, party A (100) and party B (110) are connected through several mediums including: a short-message system (SMS) medium (140) (such as text messaging utilizing cell phone towers); a social network (130) in which he or she could potentially interact with many parties through a public messages module (134) and/or a private messages module (132) (e.g., TWITTER, FACEBOOK, GOOGLE+, etc.); and an alternative communication medium (120) (e.g., PINTEREST, INSTAGRAM, etc.). In the methods and systems of the prior art depicted in FIG. 1a, if party A (100) sought to view what party B (110) mentioned in an SMS message and a private message of the social network (130), party A (100) would first have to open an application that uses the SMS medium (140), then locate party B (110) within the application to view the conversation. Once that communication was located and read, party A (100) would next have to subsequently activate a separate application for the social network (130) and find party B (110) in the private messages module (132) and view the conversation. Thus, in order to see the details of two messages, party A (100) would have to open and utilize two separate applications and navigate to the same contact in each separate application.

While there are many benefits and uses for different communication mediums, the process of finding interactions between two or more parties can become exceptionally cumbersome. This previous example has a limit of three mediums of interactions; however, it is not uncommon for parties to have two, four, or even more mediums in which they are connected and communicate. Understandably, the time and nuisance constraints of locating and managing communications between two separate parties across multiple applications only multiplies the greater the number of separate applications used by the parties to communicate to each other.

Figure 1B:
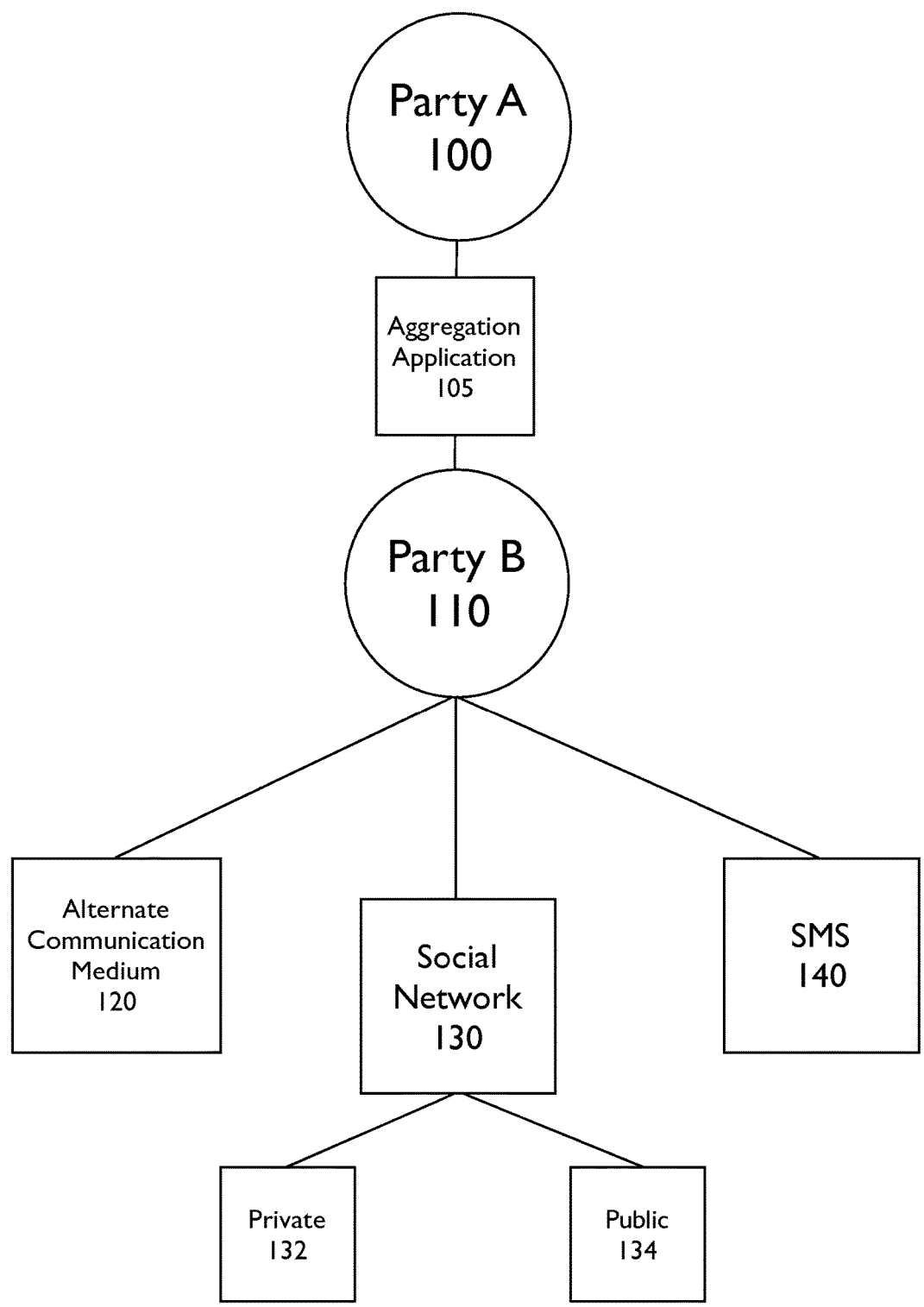
FIG. 1b depicts a flowchart of a method for how interactions between two parties across multiple communication applications occurs in the systems and methods of the disclosed aggregation application.

FIG. 1b describes an embodiment of the aggregation application described herein. In this embodiment, party A (100) would activate a computer-implemented aggregation application (105) and select party B (110) from a listing of one or more parties. The aggregation application (105) would subsequently activate a search for any exchange between party A (100) and party B (110) across numerous available applications or mediums. In the embodiment depicted in FIG. 1b, the available applications or mediums include an SMS medium (140), and the public messages module (134) and the private messages module (132) of the social network (130), and the alternative interactions medium (120). The search would aggregate and display the interactions from party B (110) across these multiple applications or mediums in a single interface for the consumption of party A (100). Stated differently, contrary to the prior art methods and systems, party A (100) would no longer need to open, interact, navigate and close each of the separate applications or mediums (e.g., the SMS medium (140), the public messages module (134) and the private messages module (132) of the social network (130) and the alternative interactions medium (120)) to view the communications from party B (110) made in each of these applications or mediums. This provides a multiplicity of benefits over the methods and systems of the prior art including, but not limited to, the following: 1) it would shorten the time party A (100) spent searching for interactions in separate applications and/or mediums for a specific interactions he or she sought (or to ensure party A (100) saw all possible communications from party B (110)); 2) it would aggregate the interactions of party A (100) and party B (110) in an easy-to-read one-stop-shop listing, and 3) it would provide extra context and/or information in case the conversation spanned more than the number of expected mediums and/or messages.

Using the method described in this embodiment, party A (100) may have heard that party B (110) had recently posted a message in one of the aforementioned mediums but party A (100) did not know which medium was used. In this case, contrary to the prior art where party A (100) would have to open, navigate and utilize each application and medium through which party A (100) and party B (110) had a communicative relationship, party A (100) would just need to open one application to view the newly posted message. No searching across multiple applications or mediums would be necessary.

Under some embodiments of prior art, if party B (110) sent a private message on a social network (130) referencing party A (100), party A (100) would receive an e-mail notification of the private message and then have to navigate to the social network (130), click on the private messages module, search for party B (110), and activate the applicable message stream. Under the embodiment of this aggregation application as seen in FIG. 1b, party A (100) would merely need to activate the aggregation application (105) (and in some contexts search for party B (110)) to find the new message. Further, any other messages party B (110) had sent to party A (100), irrespective of the medium or application upon which they were sent, would also be available to party A (100) by simply activating the aggregation application (105).

Figure 2:
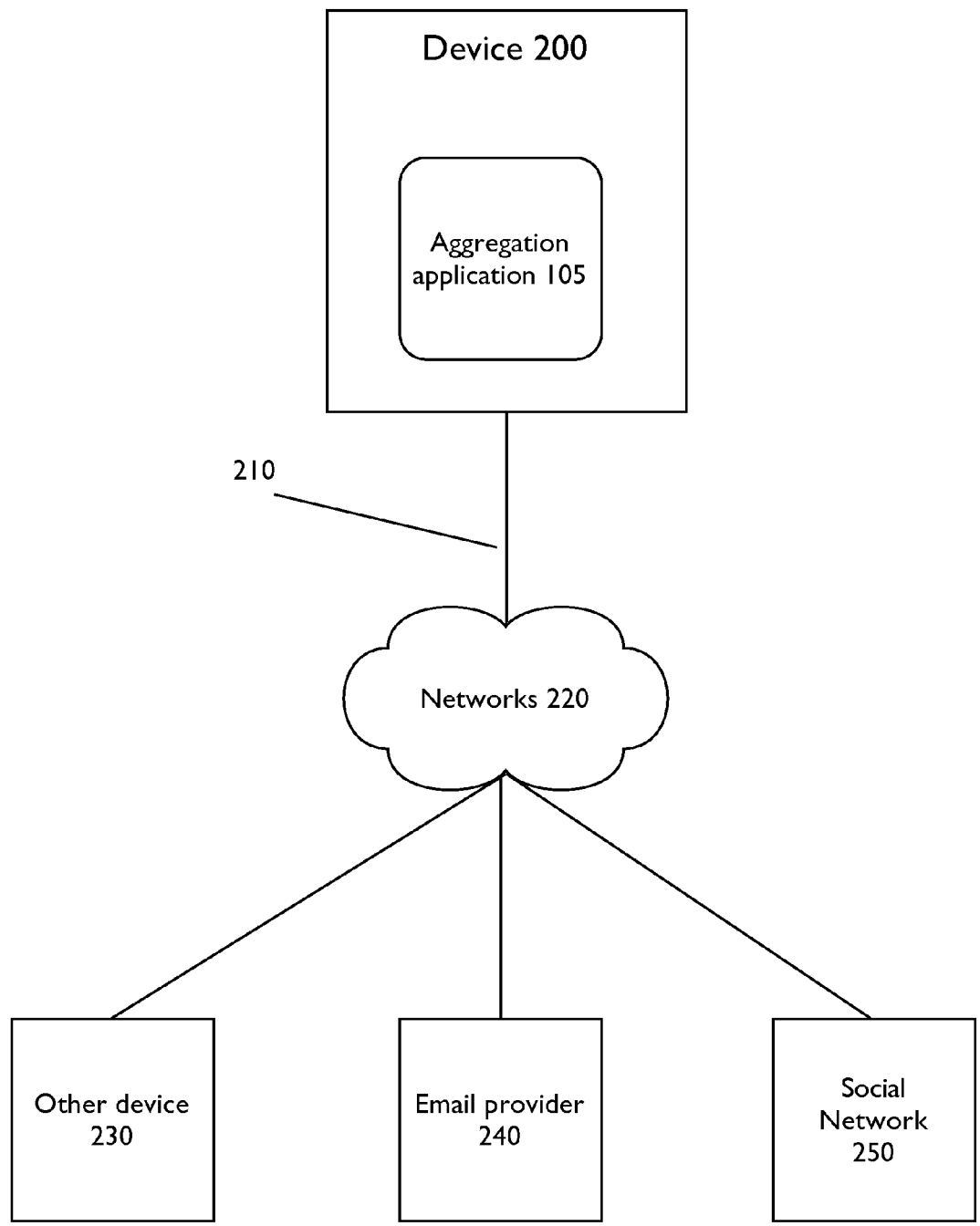
FIG. 2 is a block drawing that depicts an embodiment of the process of gathering information to a single application according to an embodiment of the aggregation application.

FIG. 2 illustrates the relationship between an embodiment of the aggregation application (105) and the one or more interactions mediums and/or applications from which it aggregates. A computing device (200) operates the aggregation application (105) and has the capability to connect to other computing devices through a variety of networks (220). These networks can connect to computing devices and/or servers that are running a social network (250) or an electronic mail service provider (240). This variety of networks (220) can also connect the computing device (200) directly to another computing device (230). The variety of networks (220) can include, but are not limited to: LAN (local area network), WAN (wide-area network), telecommunications, WIFI networks, and/or satellite networks. FIG. 2 illustrates a line of interactions (210) going to the variety of networks (220). It should be understood that this line (210) can reflect one or more different methods of connecting to a network with the non-limiting possibilities of BLUETOOTH, WIFI, an Ethernet cable, fiber optics, and/or a USB connection. In certain embodiments, it is also contemplated that the computing device (200) will also include hardware and/or software allowing access to the Internet or other network by any mechanism currently known or later discovered including, but not limited to, through a modem and phone line, mobile phone communication standards, a Digital Subscriber Line (DSL) connection, a cable modem, a T1 or T10 high speed connection, a wireless connection, or any other connection.

Throughout this application, the term "computing device" will be used to describe hardware which implements functionality of various systems. The term "computing device" is not intended to be limited to any type of computing device but is intended to be inclusive of all computational devices including, but not limited to, processing devices or processors, mobile phones, tablet computers, personal computers, work stations, servers, clients, portable computers, and hand held computers. Further, each computing device discussed herein is necessarily an abstraction of a single machine. It is known to those of ordinary skill in the art that the functionality of any single computing may be spread across a number of individual machines. Therefore, a computing device, as used herein, can refer both to a single standalone machine, or to a number of integrated (e.g., networked) machines which work together to perform the actions. In this way the functionality of a computing device may be at a single computing device, or may be a computing device network whereby the functions are distributed. Further, the term "software" and/or "application" refers to code objects, logic, or command structures, written in any language and executable in any environment designed to be executed by or on a computing device. It should be recognized that software functionality can be hardwired onto a chip or into other hardware while still considering it software within the meaning of this disclosure.

Figure 3:
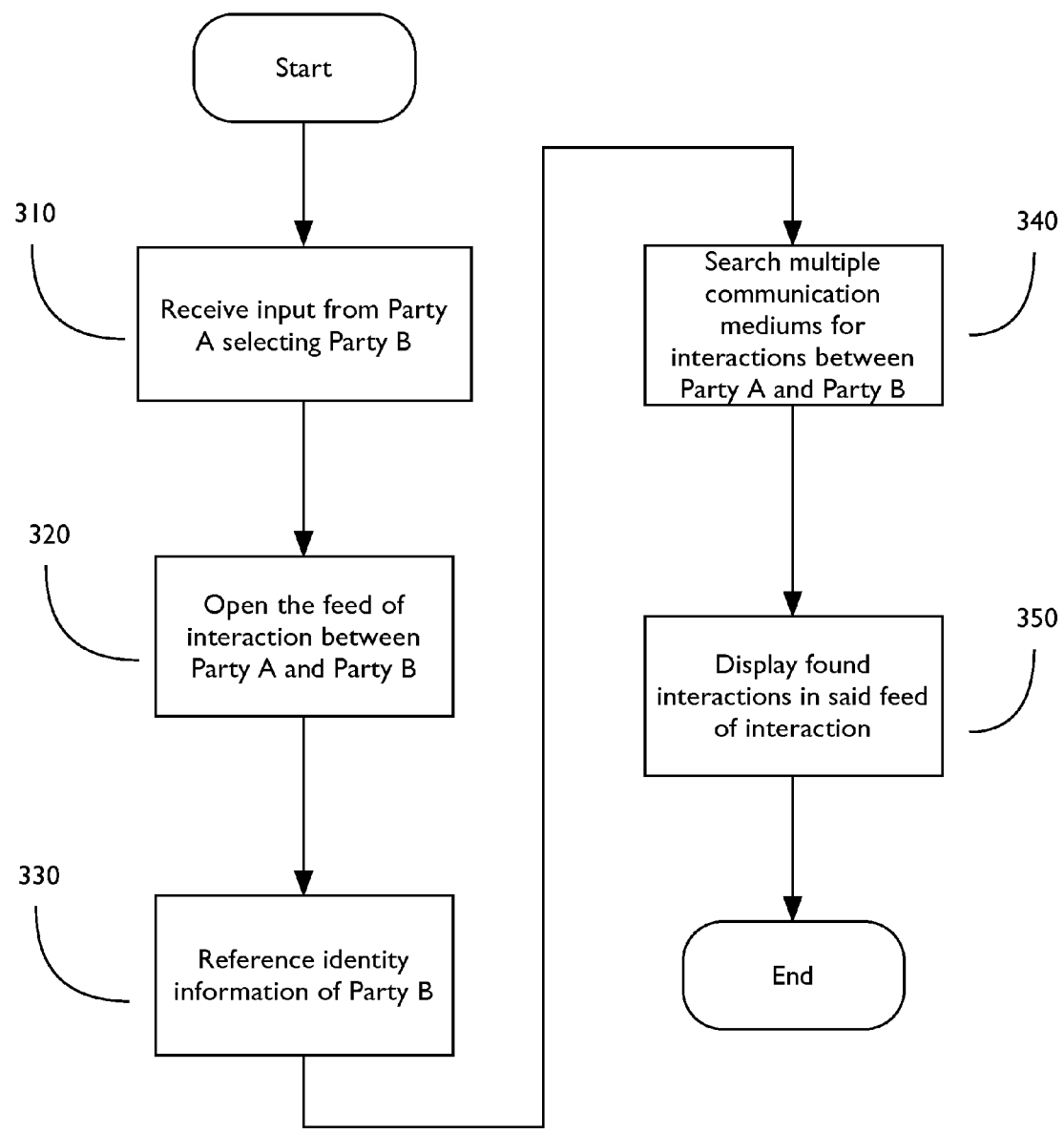
FIG. 3 depicts a flowchart of an example method by which a command may be performed according to one or more aspects of an embodiment of the aggregation application described herein.

FIG. 3 illustrates a method as an example by which a command may be performed by an embodiment of the aggregation application according to one or more aspects herein described. It should be understood that the method illustrated in FIG. 3, may be implemented in and/or performed by and/or in conjunction with a computing device (200) as known by those of ordinary skill in the art.

In the method provided in FIG. 3, in a step (310), the aggregation application receives input from a user, such as party A (100) (which was described above in FIG. 1), wherein such input selects another party or parties as to view an accumulated interaction stream between the two or more parties (e.g., a user interface (500) of FIG. 5, which is further described below). In at least one instance, the input from step (310) can include selecting a party from a listing of one or more parties through the physical depressing and releasing of a finger on a touchscreen of a computing device. Step (310) can also be accomplished through a variety of other methods including, but not limited to, using a computer mouse to click on the selection, physically swiping a touch screen device, typing or otherwise inputting a name into the device, verbally speaking a name using a voice detection device and/or using a facial recognition feature. In some embodiments of the aggregator application, if the aggregator application does not recognize the name inputted in step (310), the software may be programmed in a way that it requests clarification on the choice from party A (100).

In a step (320), upon receiving and recognizing the input selection in step (310), the application would activate and open the feed of interaction between party A (100) and party B (110). An example of this feed can be found in the user interface (500) of FIG. 5. In some applications of this embodiment, the feed between the two or more parties would contain interactions that have previously been received and/or recorded on the storage of a computing device. These interactions can include a multiplicity of interaction types. In one or more instances, these may include: a record of a phone call interactions, a history of voicemails, a listing of messages exchanged on a social network, a listing of SMS messages, and/or an inventory of online social interactions such as a "like" on FACEBOOK or a "retweet" on TWITTER. This feed of interaction could potentially be limited by the user to similar types of interaction such as just photos that include the parties or just text-based messages interchanged involving the parties. As described below, there are times when step (320) could be programmed to occur later in the embodied method described in FIG. 3.

In a step (330), the selection in step (310) would reference stored identity information. The location of this stored information can potentially be varied. It could be found on the native computing device (200) that is executing the aggregation application or could even be found on an external device such as "the cloud." Some embodiments of this step could be: a contact book with stored identification information, a near-field interaction system that verifies identities with another party in its range, or an online social network account page that lists identity information from several other mediums. This identity information should not be seen as being limited to text-based identities. In one embodiment, the aggregation application may use facial recognition technology to identify a person and search for interaction based on the identifying information of his or her photos. In another embodiment, a voice recording could be analyzed and previously-stored recordings could be seen as identifying information for the second party.

In some embodiments of the aggregator application, step (330) can occur prior to step (320) in that the programming of the aggregator application would begin the process of identifying the secondary party in the background and step (320) would subsequently activate followed by the search as defined in a step (340). Depending on the programming, this potentially could allow the process of aggregating the interactions to occur sooner and create less of a wait time for the user. Even further, in some embodiments, both step (330) and step (340) could occur before step (310). In many of these instances, the aggregation application could be aggregating the information on a continual basis in the background as to ensure that the interaction information is readily available when the user initiates step (310). This would allow the user to view the aggregated information in real-time with essentially no time spent downloading the information from the applicable mediums.

In step (340), the application takes the reference identification information from step (330) and searches a listing of communication mediums and/or applications for interactions between the parties. As noted previously, contemplated communication mediums and/or applications include, but are not limited to: phone calls, voice mail, SMS messages, and interactions on social media applications known to those of ordinary skill in the art such as FACEBOOK, TWITTER, INSTAGRAM, and other social media applications known now or in the future to those of ordinary skill in the art. This listing of mediums and/or applications could be based in part or wholly upon the type of identification information received. In these applications, the identification information could be listed in a manner that two pieces of identifying information are paired as to indicate which mediums to search (such as, "telephone number" and "555-555-5555") or the information could include the medium identification within itself (such as a FACEBOOK profile being identified by "http://www.facebook.com/username").

This is not to preclude some embodiments where the aggregation application utilizes the identification information to search through any applicable mediums for the correct second party (such as facial recognition technology that can be searched through any medium that contains user photos, etc.). In at least one arrangement, this search could be used with mediums and/or applications for which the user has given the aggregation application permission to access. In many instances, the mediums and/or applications will allow to users to interface with the medium and/or application at a higher level and with more details when the user has provided credentials to the aggregator application that can access the medium and/or application. This will provide the application with the ability to search for public interactions as well as private interactions between the user and the selected party or parties.

In many cases, both the user and the selected party or parties will have accounts with the medium and/or applications in which they are communicating. In some of these mediums and/or applications, private interaction is an optional way to interact. Other mediums or applications may not require users to have accounts in order to interact. In one embodiment of step (340), the aggregation application could use previously-recorded exact account information about the selected party to aggregate interactions for the one or more mediums in which both parties are a part; at the same time, it could use other identifying information (facial recognition, voice recognition, birthdates, common internet usernames, etc.) to search through mediums in which one or both parties do not have an account or are not signed into an account.

In some applications, the new interactions found from step (340) would be used to append the feed of interaction from step (320). This would allow the feed of interaction to give a full preview of interactions including those that have been previously loaded as well as new and/or newly updated interactions (as stated in a step (350) below). These applications could use a process whereby the starting point for the search in step (340) is the last interaction recorded from each perspective communication medium.

In step (350) of this embodiment, the newly accumulated interactions and/or interactions aggregated from step (340) are displayed in the feed of interaction of step (320). This updated feed, in some implementations, could use an indicator (such as a color, number, shape, etc.) to allow the user to quickly determine which interaction was new.

Figure 4:
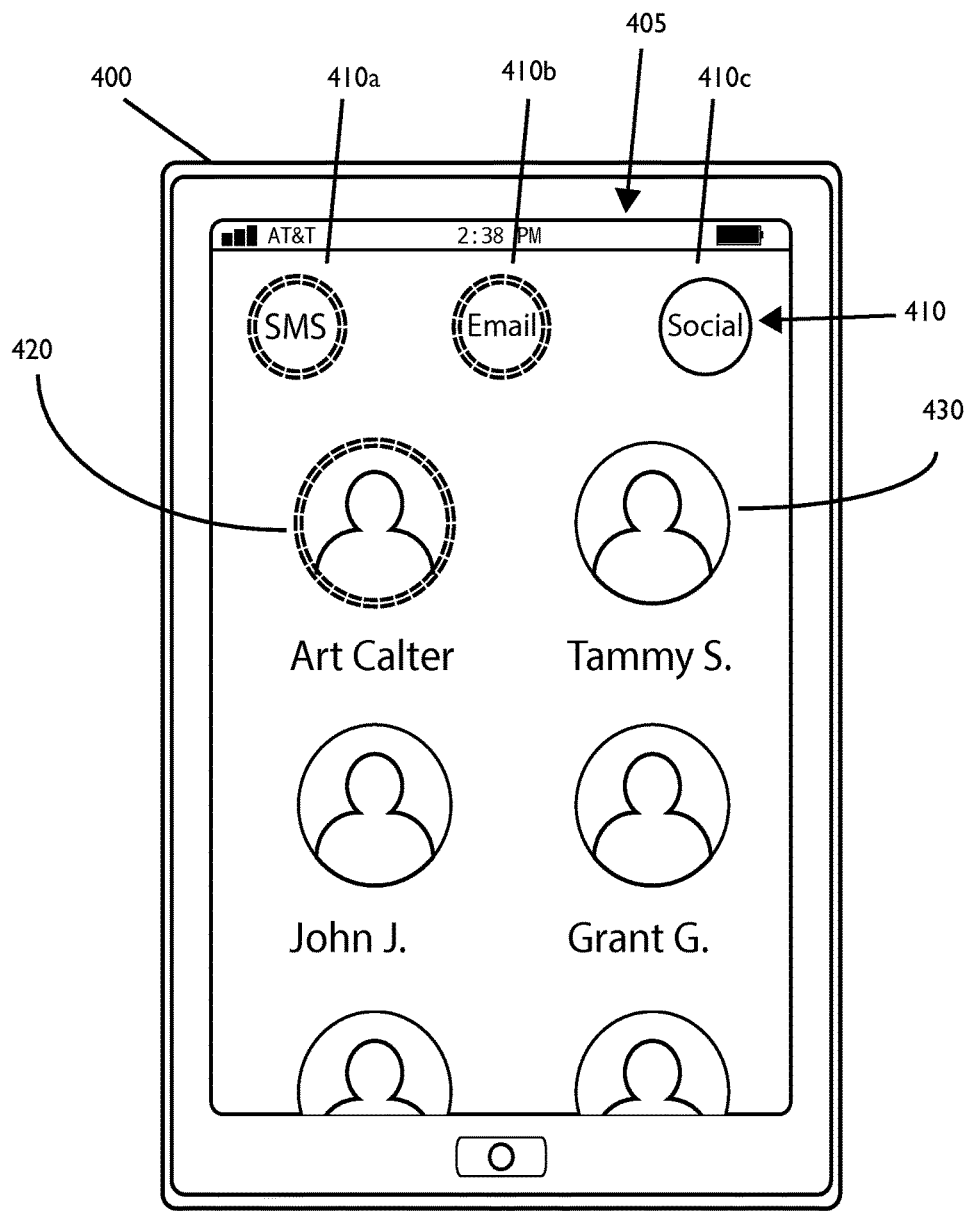

FIG. 4 illustrates an embodiment of an interface of the aggregation application described herein. In this embodiment, the aggregator application is hosted on a computing device (400) capable of running software utilizing components of computerized devices (e.g., processor, display, interaction capabilities, etc.). Contemplated devices (400) described in this embodiment include, but are not limited to, a mobile device such as the APPLE iPad or iPhone, an ANDROID phone, a WINDOWS surface tablet, or other mobile devices that can receive input, operate computing functions, connect to a network, and display a user interface. In FIG. 5, the interface of an activated aggregation application is being run on the computing device (400) and the interface is demonstrating a number of parties who have a relationship with the user.

Figure 5:
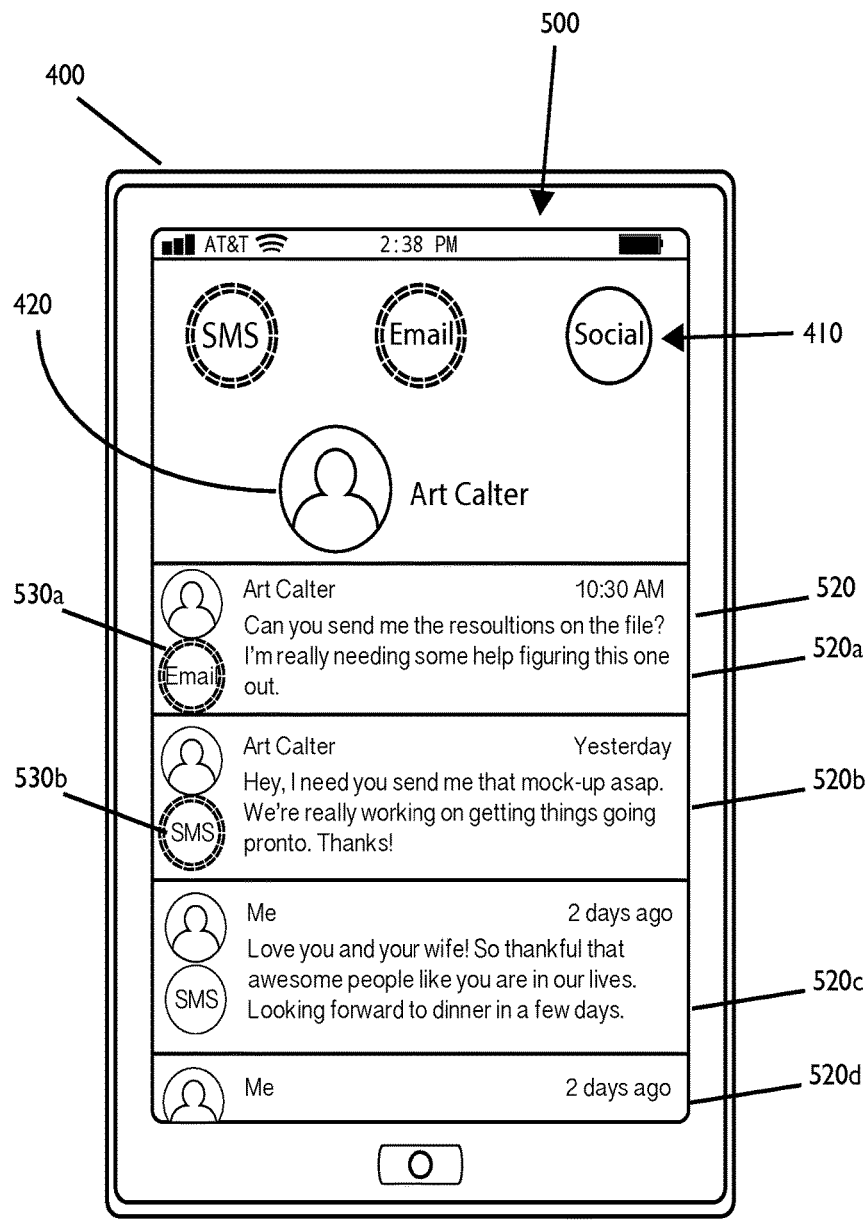
FIGS. 5-7, 8a and 8b depict various embodiments of contemplated interfaces of relational interaction aggregation for different embodiments of the aggregation application disclosed herein.

Among other things, in the embodiment depicted in FIG. 5, the user interface (405) displays friends, business associates, family members, and/or other connections of the user of the aggregator application. In this embodiment of the aggregator application, the user has already logged in and/or has permissions to activate the accounts to the multiple communication mediums and/or applications accessed by the computing device (400). In the embodiment depicted in FIG. 4, upon viewing a listing of accounts (410), the user can see that he or she has the application connected to three accounts: SMS, email, and a social media account. In the embodiment depicted in FIGS. 4 and 5, the user can see by the visual representation of bolded and double-dashed circles that a SMS medium (410a) and an email medium (410b) both have newly updated interactions. In the embodiment depicted in FIGS. 4 and 5, the user does not have new interactions from a social network medium (410c) according to the application indicators.

In the embodiment depicted in FIG. 4, the user's friend, a party (420), has sent a new piece of interaction as indicated by the visual cues around the avatar for the party (420). Another party (430) has no indicator around her avatar. This absence of an indicator demonstrates that no new interaction in these mediums has occurred since the last time the user checked into the aggregation application. According to some arrangements, this could indicate that while party (430) has no new interaction, she sent or received the second most recent interaction in the user's log based upon the location of the party's (430) avatar on the interface. Based on the logic of this example, party (420) has sent at least one SMS and at least one e-mail to the user since the last time the interaction feed of the aggregation application was updated. The avatars of connections in this example would have the capabilities of being selected in order that the user could view an aggregated feed of interaction between the two parties on the available mediums and/or applications (in the depicted embodiment, SMS (410a), e-mail (410b), and the social network (410c)). It should be noted that any form of identifying a party known to those of ordinary skill in the art, including but not limited to, avatar, name, identification number, etc., is contemplated in the aggregation application of this disclosure.

FIG. 5 is a continued illustration of FIG. 4 after a particular party, in this case party (420), has been selected. Upon the selection of party (420), the embodiment of the user interface (500) depicted in FIG. 5 is activated, showing a feed of interaction (520) between the user and party (420). The feed displays interaction coming from party (420) to the user as well as interaction going to party (420) from the user—i.e., the feed displays all interactions between the user and party (420) across multiple mediums and/or applications in a single user interface. An interaction (520a) is an example of how the interactions could be displayed in one embodiment. As depicted in FIG. 5, in this embodiment, each interaction could contain the actual interaction, a timestamp, the name of the party (as a way to quickly differentiate between the other party and the user), the party's avatar from the medium of interaction, and the medium on which the interaction occurred. In this embodiment, indicators (530a) (530b) are visual signals that the associated interaction is a new piece of information (indicated by the bold double-dashed indicator circles in this embodiment) and that it comes from a specific medium. The interactions displayed in this embodiment (520a), (520b), (520c), and (520d) are individual pieces of interaction sent through various mediums by either the user or party (420).

Figure 6:
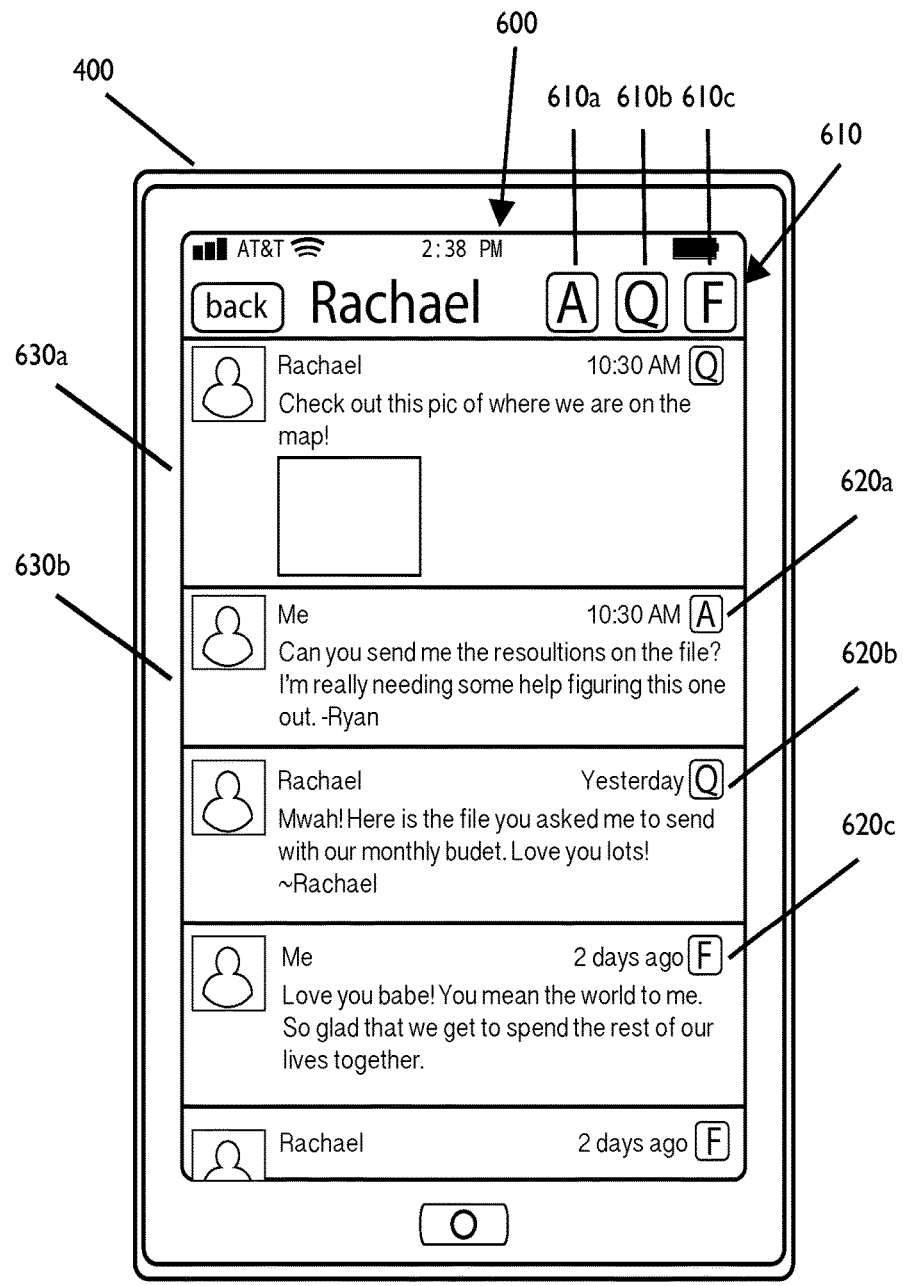

FIG. 6 illustrates another embodiment of an interface of the aggregator application described herein. In FIG. 6, an application is running on computing device (400) whereby interaction between the user and another party is aggregated from a plurality of mediums and/or applications (610a), (610b), and (610c) into one feed displayed by a user interface (600). An interaction (630a) illustrates that communication can come in many forms and mixture of forms including text and a multimedia element such as a photo. While multimedia elements are allowed, an interaction (630b) demonstrates that a text-based interaction alone may be used in certain embodiments. A series of medium indicators (620a), (620b), and (620c) demonstrate that while the example feed displays a multitude of interactions between the two parties, the interactions can be from across varied mediums and/or applications. A listing of mediums and/or applications (610) shows that, in this embodiment, there are three mediums and/or applications in which the aggregation application has record of a connection between the two parties. In some instances, the aggregation application may have the capability to be connected to more mediums than displayed in the listing of mediums (610) depicted in FIG. 6, yet, in this embodiment, for the clarity of the user, the application limits the displayed mediums and/or applications to those in which the two parties displayed in user interface (600) of FIG. 6 have a connection.

Figure 7:
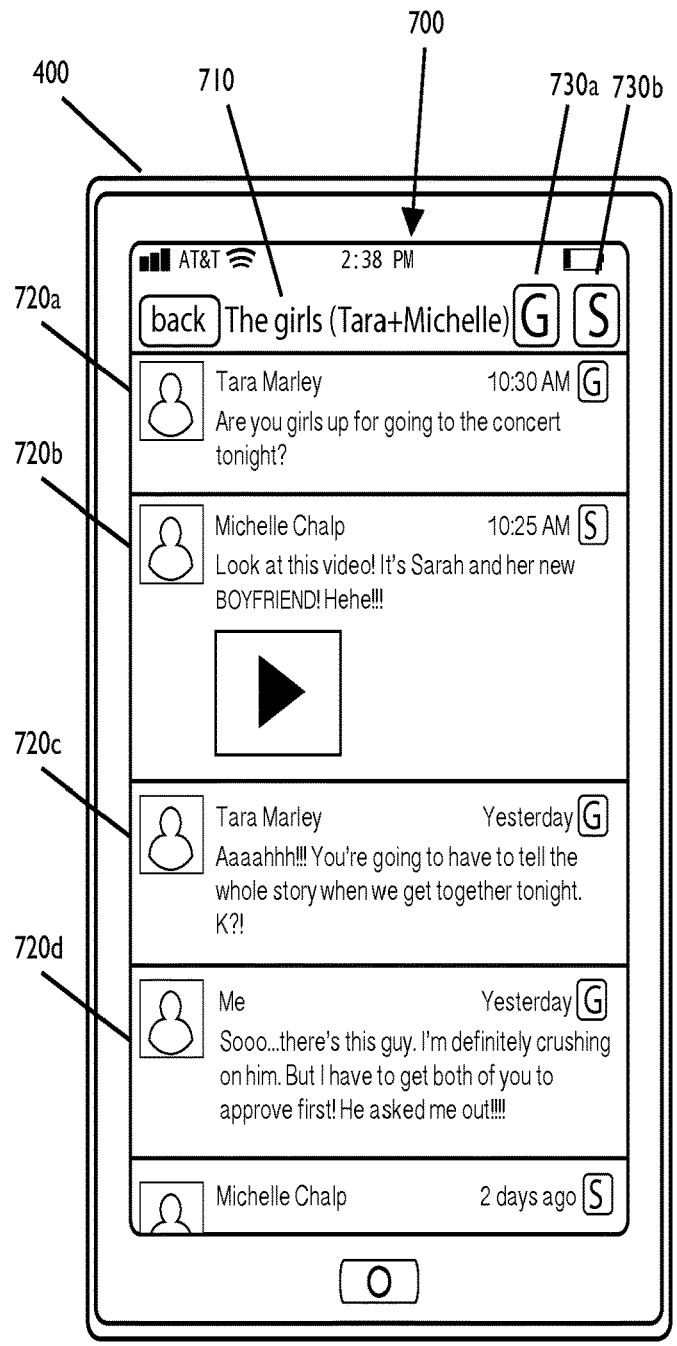

FIG. 7 is depicts an embodiment of another interface of the aggregator application described herein. This embodiment shows the usage of an embodiment of the aggregator application in the context of group conversations. While the goal of some embodiments of the aggregator application would be to use this method as a way to aggregate individual-to-individual conversations, there are other embodiments that would seek to aggregate any communication from within a group context (e.g., close-knit groups, families, church youth groups, etc.). Various mediums and applications allow group conversations that would fit into this category (e.g., SMS group text messaging, GROUPME, GOOGLE PLUS circles, FACEBOOK groups, etc.). In some embodiments of this group-oriented method, the aggregation application could detect group members from each group across various mediums and aggregate interaction based solely on groups with the exact same members. In other embodiments of this method, it is contemplated that the aggregation application could determine which groups coincide (even if members of duplicate groups in opposing mediums are not the same) through an intelligent formula or user input.

In the embodiment depicted in FIG. 7, the computing device (400) is running an application that aggregates group conversations across mediums and/or applications. As depicted in FIG. 7, in this embodiment, a user interface (700) demonstrates a possible interface that the aggregator application could have. Near the top of this user interface (700), a title (710) clarifies what group's communication is being aggregated. Depending on the embodiment, it is contemplated that the title (710) could be a variety of titles (user-defined titles, application-defined titles, medium-defined titles, or other titles). Further, in some groups, it is contemplated that the title (710) could be as simple as "us" or "the fam."

In the depicted embodiment, an interaction (720a) demonstrates Tara Marley making a comment to everyone within the group on a communication medium (730a). An interaction (720d) exhibits the user beginning a new subject of communication with a text-based interaction on medium (730a). An interaction (720c) shows Tara Marley continuing that conversation within the group on medium (730a) with another text-based interaction. Because the conversation is between a group of friends and because the flow of human interactions cannot be restrained to any specific medium, this conversation is not limited to stay in medium and/or application (730a). Thus, an interaction (720b) demonstrates a third friend, Michelle Chalp, continuing this conversation with a text and multimedia message on a medium (730b). Medium (730a) could potentially be a less-than-desirable medium on which to transmit a video that pertains to the conversation, so interaction (720b) may have been placed on a medium that better facilitated the communication.

Figure 8A:
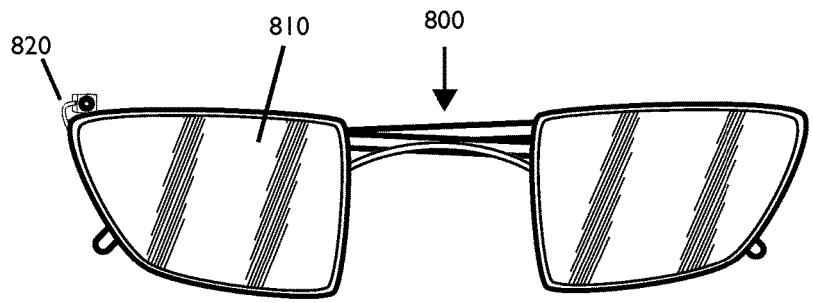

FIG. 8a demonstrates another embodiment of a contemplated interface for the aggregator application disclosed herein. In this embodiment, the computing device on which the interface is displayed is a pair of computer-enhanced glasses (800). These glasses (800) are an example of just one of the many different computer-enhanced wearable devices that could become popular in upcoming years for the purpose of conveying content. These devices could include, but are not limited to, glasses, contact lenses, hearing aids, and watches. These devices could have a built-in computing device or could connect to a computing device through a wireless connection (e.g., WIFI, BLUETOOTH, etc.), a wired connection (e.g., USB chord, etc.), or a variety of other possibilities. While one of the features of the wearable devices is to display content to the user, the device would, in many situations, use a computing-device to receive and execute commands. It should be understood that the term "computing device" as used herein includes these types of wearable computing devices.

In the embodiment depicted in FIG. 8a, the glasses (800) are equipped with two defining features. In this embodiment, one of the lenses in the frame would simultaneously serve as a display screen (810) built into the lens as to display certain pieces of information for the user to consume. In this embodiment, the display screen (810) has the ability to adjust the transparency of the display between the live view and the digitally-enhanced view. This transparency functionality may not be the same in other embodiments. Display screen (810) would show content as directed by the associated computing functions. In the depicted embodiment, a camera (820) is built onto the glasses (800) as a way to capture images and/or videos that are in front of the frames. A user may choose to take photos of events or even use the camera for other computing functions. One such function would be the use of facial recognition technology.

Figure 8B:
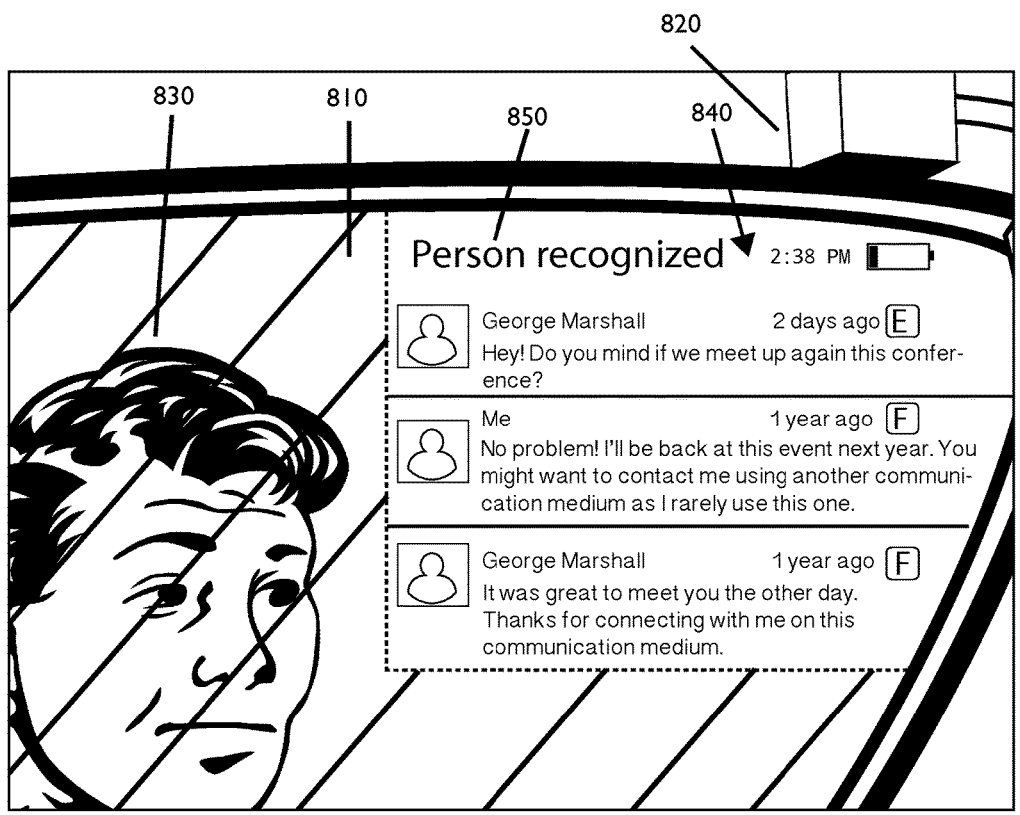

FIG. 8b is a first person view of the user of glasses (800) depicted in FIG. 8a. In this figure, the user is looking through the lens that contains display screen (810) interface of the aggregator application. The first person view demonstrates that the person is nearby in proximity to a person (830). In this example, the user has forgotten what connections he or she has with person (830). The user of the glasses activates the aggregator application utilizing an embodiment of the method herein described. Using the on-board camera (820), the aggregator application captures an image or video of person (830) and uses facial recognition to reference their identity. After searching the communication mediums applicable to the user, the interface of the aggregator application displays an indication (850) that the person (830) is recognized. It subsequently references what communication has occurred between the user and person (830). The application then sends instructions to the display screen (810) to show a user interface (840) containing a listing of the applicable cross-medium communication between the user and party (830). The embodiment of the user interface (840) depicted in FIG. 8b gives the user additional identification information concerning the other party.

As touched upon previously, various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Further, aspects of the disclosure have been described in terms of illustrative embodiments thereof. Numerous other embodiments, modifications, and variations within the scope and spirit of the invention will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. The sole and exclusive indicator of the scope of the invention and what is intended by the applicants to be the scope of the invention, is the literal and equivalent scope of the set of claims that issue from this application, in the specific form in which such claims issue, including any subsequent correction.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. A method of aggregating electronic communications in a communication application aggregator system, the method comprising:
    a computing device receiving inputs from a plurality of different communication mediums;
    said computing device executing a communication aggregator application, the communication aggregator application having a user permission to access said plurality of different communication mediums;

said computing device accessing a database, wherein said database stores identity information for a plurality of parties;

said computing device searching said inputs for records of communications from a first of said parties based on said stored identity information for said first party, each of a plurality of communication records having an associated communication medium;

said computing device searching said inputs for records of communications from a second of said parties based on said stored identity information for said second party;

said computing device indexing said communications from said first of said parties into a first communication stream;

said computing device indexing said communications from said second of said parties into a second communication stream;

said computing device correlating at least one of said communications from said second of said parties with at least one of said communications from said first of said parties, wherein said correlated communications identify each said first party, said second party, and a user of said computing device, each said first party, said second party, and said user defined as an identified communication group;

said computing device aggregating said first communication stream and said second communication stream into a single new communication stream, said single new communication stream associated with said identified communication group; and said computing device presenting a listing of items corresponding to a plurality of communications from either said first communication stream, said second communication stream, or said single new communication stream on a graphical user interface (GUI) of said computing device, each item of said listing being (1) selectable in response to user input, and (2) displayed with a source medium indicator identifying a specific communication medium associated with each communication corresponding to each item.

2. The method of claim 1 wherein said GUI is a component of a user wearable device.

3. The method of claim 1 wherein at least one of said parties comprises a group of human users of at least one of said different communication mediums.

4. The method of claim 1 wherein said plurality of said different communication mediums includes at least one of: a social media platform, a short message system (SMS) based communication system, an electronic mail system, a telephone based communication system, a mobile device based interaction, or an internet based message.

5. The method of claim 1 wherein said first of said parties are selected by a human user.

6. The method of claim 1 wherein said first of said parties are selected by said computing device performing an automated recognition function.

7. The method of claim 6 wherein said automated recognition function utilizes at least one of: a facial identification, a geographic location, or a vocal identification.

8. The method of claim 1 where said database is physically remote from said computing device.

9. A communication aggregator system comprising:
a computing device capable of receiving inputs from a plurality of different communication mediums;
a communication aggregator application stored within said computing device;
a user permission stored within said communication aggregator application for access to said plurality of different communication mediums;
a database containing a plurality of parties stored by an identity information for each party; and
a processor of said computing device, said processor configured to accept and execute a plurality of instructions from said communication aggregator application to implement said communication aggregator system, said plurality of instructions including, 1) an executable search of said inputs for records of communications from a first of said parties based on said stored identity information for said first party, each of a plurality of communications having an associated communication medium, 2) a search of said inputs for records of communications from a second of said parties based on said stored identity information for said second party, 3) an index of said communications from said first of said parties into a first communication stream, 4) a second communication stream presented as an index of said communications from said second of said parties, 5) a correlation of at least one of said communications from said second of said parties with at least one of said communications from said first of said parties, wherein each correlated communication relates to each said first party, said second party, and a user of said computing device, each said first party, said second party, and said user defined as an identified communication group, 6) an aggregation of said first communication stream and said second communication stream into a single new communication stream, said single new communication stream associated with said identified communication group, and 7) a graphical user interface (GUI) to present a first listing of a first plurality of items corresponding to a first plurality of communications of said first communication stream, a second listing of a second plurality of items corresponding to a second plurality of communications of said second communication stream, or a third listing of a third plurality of items corresponding to a third plurality of communications of said single new communication stream, wherein each item of each listing is selectable in response to a user input and displayed with a source medium indicator identifying a specific communication medium associated with each communication corresponding to that item.

10. The system of claim 9 wherein said GUI is a component of a user wearable device.

11. The system of claim 9 wherein at least one of said parties comprises a group of human users of at least one of said different communication mediums.

12. The system of claim 9 wherein said plurality of said different communication mediums includes at least one of: a social media platform, an short message system (SMS) based communication system, an electronic mail system, a telephone based communication system, a mobile device based interaction, or an internet based message.

13. A non-transitory computer readable medium for aggregating electronic communications, said non-transitory computer readable medium stored within a memory of a computing device and containing a plurality of instructions to be executed by a processor of said computing device, said plurality of instructions comprising:
an executable search instruction for received inputs from a plurality of different communication mediums for records of communications from a first of a plurality of parties based on a stored identity information for said first party, each of a plurality of communication records having an associated communication medium;
an executable search instruction of said inputs from said plurality of different communication mediums for records of communications from a second of said parties based on said stored identity information for said second party;
an index instruction of communication records from said first of said parties into a first communication stream;
an index instruction of communication records from said second of said parties into a second communication stream;
a correlation instruction to associate at least one of said communications from said second of said parties with at least one of said communications from said first of said parties, each associated communication relating to each said first party, said second party, and a user of said computing device, each said first party, said second party, and said user defined as an identified communication group;
an aggregation instruction to merge said first communication stream and said second communication stream into a single new communication stream, said single new communication stream associated with said identified communication group; and
a first graphical user interface (GUI) data set instruction to present a listing of a first plurality of items corresponding to a first plurality of communications of said first communication stream, a second graphical user interface (GUI) data set instruction to present a listing of a second plurality of items corresponding to a second plurality of communications of said second communication stream, and a third graphical user interface (GUI) data set instruction to present a listing of a third plurality of items corresponding to a third plurality of communications of said single new communication stream, wherein each item of each listing is selectable by a user input instruction and said first, second, or third GUI data set instruction includes a source medium indicator identifying a specific communication medium associated with each communication corresponding to each item of each listing.

14. A method of aggregating electronic communications, the method comprising:
a computing device aggregating a plurality of different electronic communications between a first party and a second party over a plurality of different communication mediums by (1) accessing the different electronic communications from the different communication mediums based on identity information and permission information for the first party and the second party, (2) indexing the accessed electronic communications into an aggregated communication stream such that the aggregated communication stream includes electronic communications between the first party and the second party from the plurality of the different communication mediums, and (3) aggregating, accessing, and indexing the plurality of different electronic communications between a third party and each the first party and the second party based on identity information and permission information for the first, second, and third party, the accessed electronic communications aggregated into a single common communication stream such that the single common communication stream includes electronic communications between the first party, the second party, and the third party from the plurality of different communication mediums; and
the computing device presenting a list on a graphical user interface (GUI) of the computing device based on the aggregated communication stream, the list comprising a plurality of selectable items, wherein each selectable item corresponds to a different electronic communication between the first party and the second party from the aggregated communication stream, and wherein each selectable item is displayed on the list with a source medium indicator that identifies a specific communication medium that was a source for that selectable item's corresponding electronic communication between the first party and the second party.

15. The method of claim 14 wherein the GUI is a first GUI, the method further comprising:
the computing device presenting a plurality of selectable parties on a second GUI of the computing device;
the computing device receiving party selection input from a user via the second GUI, the party selection input identifying the second party; and
the computing device performing the list presenting step in response to the party selection input receiving step.

16. The method of claim 15 further comprising:
the computing device performing the aggregating step in response to the party selection input receiving step.

17. The method of claim 15 further comprising:
the computing device performing the aggregating step with reference to the first party and a plurality of different second parties to create a plurality of different aggregated communication streams, each aggregated communication stream corresponding to a different second party and including electronic communications between the first party and its corresponding second party from the plurality of the different communication mediums;
wherein the party selection input identifies a specific one of the second parties; and
wherein the list presenting step comprises the computing device populating the list with electronic communications from the aggregated communication stream corresponding to the specific one of the second parties.

18. The method of claim 14 wherein the aggregating step further comprises:
the computing device searching a plurality of different communication mediums for electronic communications between the first party and the second party based on the identity information and permission information for the first party and the second party;
the computing device receiving a plurality of electronic communications between the first party and the second party from the different communication mediums in response to the searching; and
wherein the indexing step comprises the computing device indexing the received electronic communications into the aggregated communication stream.

* * * * *